United States Patent [19]

Ganesan et al.

[11] Patent Number: 5,519,640
[45] Date of Patent: May 21, 1996

[54] MULTIMEDIA FRAME RELAY CODEC

[75] Inventors: Kalyan Ganesan, Germantown; Gregory Federline, Gaithersburg; Andrew Barnhart, Gaithersburg; Ranjan Pant, Gaithersburg, all of Md.

[73] Assignee: Hughes Aircraft Company, Los Angeles, Calif.

[21] Appl. No.: 192,463

[22] Filed: Jan. 26, 1994

[51] Int. Cl.$^6$ .................................................. H04J 3/24
[52] U.S. Cl. .................................. 364/514 R; 364/514 C
[58] Field of Search ........................ 364/514 R, 514 C, 364/239.3; 348/14, 23; 370/80, 84, 95.3, 105.1

[56] References Cited

U.S. PATENT DOCUMENTS

| | | | |
|---|---|---|---|
| 3,587,058 | 6/1971 | Butler et al. | 364/239.3 |
| 3,825,899 | 7/1974 | Haeberle et al. | 364/239.3 |
| 3,868,481 | 2/1975 | Patrosky et al. | 364/239.3 |
| 4,768,188 | 8/1988 | Bainhart | 370/95 |
| 4,817,089 | 3/1989 | Paneth et al. | 370/95 |
| 4,975,906 | 12/1990 | Takiyasu et al. | 370/85.13 |
| 5,086,426 | 2/1992 | Tsukakoshi et al. | 370/85.13 |
| 5,280,481 | 1/1994 | Chang et al. | 370/95.3 |
| 5,303,237 | 4/1994 | Bergman et al. | 370/85.6 |

OTHER PUBLICATIONS

Dettmer; "Frame Relay the Networker Express" IEEE Review (1992).

Cavanagh; "Applying the Frame Relay Interface to Private Networks" IEEE Communications Magazine (1992).

Pereira et al; "Video, Sampling and Network Synchronization in a TV Codec." Melecon, Mediterranean Electrical Conf., 1991.

Huang et al; "Evolution and Integration of a Multi-Media Communication Network"; IEEE Communications, Conf., 1989.

Hartung et al; "Implementation of the CCITT Wideband Coder Using a High Performance, Fixed Point DSP." IEEE Acoustics 1988.

Cooper; "Network Technology for Multimedia", IEEE Colloq. 1992.

Atkins et al; "Whither Broadband—A Perspective on Wide-Area Networking"; Broadband Services, Systems, and Networks (1993).

*Primary Examiner*—Ellis B. Ramirez
*Attorney, Agent, or Firm*—John T. Whelan; Gordon R. Lindeen, III; Wanda Denson-Low

[57] ABSTRACT

A multimedia codec for a frame relay network. Multiple information media from different sight equipment is converted to a standard packet for transmission over said frame relay network. Incoming frames are processed on a priority basis and stored in an elastic buffer. Tests of pointers are kept for each media type identifying the location in the elastic buffer of the various packets for the different media. Applications running in the frame relay processor retrieve the stored media data and forward it to a digital signal processor connected to respective terminal equipment.

15 Claims, 11 Drawing Sheets

MULTIMEDIA FRAME RELAY CODEC

The present invention relates to public or private frame relay networks. Specifically, a multimedia codec for converting voice, fax and/or video information into frame relay packets and decoding received frame relay packets into voice, fax and/or video data is described.

Frame relay wide area networks are now in use internationally. These networks provide for the distribution of data packets between a sending location and a receiving location. The frame relay network provides for variable time frames for routing packets to a specified destination location.

The frame relay network being all digital holds the possibility of sending all media information which can be reduced to a packetized digital signal. In the case of voice transmission coding algorithms may be used to maximize the bandwidth. Further, techniques used in related technology, such as cellular telephone communication, which relies on voice-activation for transmission of a packet, silent periods between speech bursts are available for other packet transmission, may be implemented in the frame relay network environment.

The frame relay network presents problems which are unique to frame relay networks. For instance, the network has a delay which must be accommodated at each codec, both transmitting and receiving. Further, the algorithm used to encode any of the media signals must be tolerant to the occasional frame loss occurring in a frame relay network. Forward frame loss correction must also be provided, compatible with the various media information carried over the frame relay network.

The implementation of a multimedia network requires that there be a capability for processing incoming frames from the frame relay network so that data packets belonging to one media, such as voice, are distinguishable from data packets which may be identified with a video service or data service. Further, there must be a priority mechanism employed in any frame relay interface which will handle incoming data packets on a priority basis.

In order to make use of the standard media hardware, it is important that the codec operate with standard voice data, fax data and/or video data formats. Thus, support must be given to 56 kbps audio, 9.6 kbps fax signals, as well as video interfaces for the recognized 174 kbps and 384 kbps digital video.

SUMMARY OF THE INVENTION

A multimedia frame relay codec is provided which can service incoming frames received on a node of the frame relay network on a priority basis, while preparing outgoing frames on a background basis. The codec interfaces with line interface units of different signal media such as digital voice, fax and video signals. A digital signal processor associated with each of the line units converts the received signals into compressed data formats using any one of a number of conventional compression algorithms.

A transport processor provides for the interface between the digital signal processors and node of the frame relay network. The frame relay processor operates in the foreground to process frame bytes, stripping and sending measurement bytes to a frame relay statistical application running in the frame relay processor. Voice data, fax data and video data are moved from the frame and loaded into an elastic buffer.

The frame relay processor also creates an outgoing frame comprising one or more streams of data received from the digital signal processors. Overhead bytes are added to the frame, defining a sequence number for each frame which is used in the frame relay application of the receiving codec.

The frame relay processor is organized into foreground and background operations. Foreground operations having priority will process incoming frames by removing data contained therein and storing for each of the various media data packets in a common elastic buffer. Tables of lists are compiled, identifying the location in the elastic buffer of data packets pertaining to a specific media. Application programs operating in the background will process the stored data and forward it to the respective digital signal processor and its connected line unit.

DESCRIPTION OF THE PREFERRED EMBODIMENT

Figure 1:
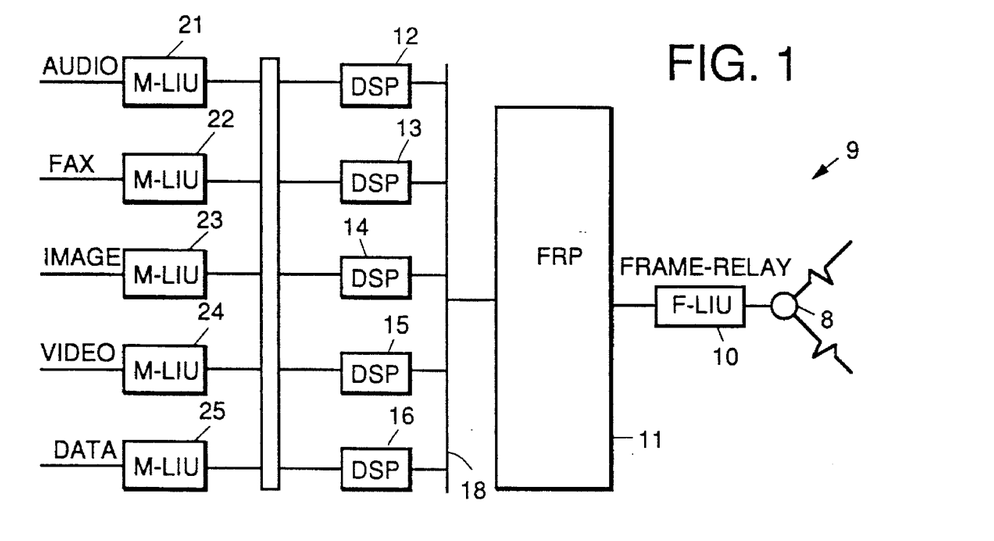
FIG. 1 is an overall block diagram of a multimedia frame relay codec in accordance with the present invention.

Referring now to FIG. 1, there is shown a frame relay network 9 and a node of the network 8. The node 8 is a port on the network to which a codec can be attached for receiving and transferring information over the frame relay network 9.

The network 8 is connected to a codec through a line interface unit 10. The interface unit provides for termination functions to the node 8 and codec. The line interface functions are more particularly described in an industry standard such as CCITT V35 EIA 530.

The process of creating frames for transmission on the frame relay network 9 is carried out in a frame relay processor 11. The frame relay processor will set up calls over the frame relay network 9, as well as remove data from a frame on the frame relay network 9, addressed to the codec. The frame relay processor receives from a plurality of digital signal processors 12–16, packets of digital data which may belong to different media, such as digitized audio, digitized fax, digitized image, digitized video or digitized computer terminal data. The packets received from each of the digital signal processors 12–16 are formatted in accordance with the frame relay network protocol, and a frame is constructed including the various media data packets and the required frame overhead packets for transferring the data over the frame relay network.

Additionally, packets received over the frame relay network 9 are organized by the frame relay processor 11 into distinct media types, so that they can be conveyed to the appropriate digital signal processor 12–16. Each of the digital signal processors 12–16, as well as a separate line carrying computer data from a line interface unit 25, is connected to an input/output port of the frame relay processor. The frame relay processor 11 will conduct a data transfer for packets received over the frame relay network 9 to a corresponding digital signal processor 12–16.

The respective digital signal processor performs signal processing functions such as encoding or decoding for multimedia signals received from a respective line interface unit 21–25. The digital signal processors will employ standard compression algorithms and convert the input signals to data packets which will be forwarded to the frame relay processor 11. The frame relay processor 11 may be a standard processor, such as the Intel 486/25 MHz. processor configured as will be described to operate the frame relay network protocol.

Each of the digital signal processors also performs the call processing between terminal equipment connected to each of the line interface units 21–25 and the frame relay processor, which will receive incoming frames of media data for each of the terminal equipment. The digital signal processors may be of a standard design, such as the Texas Instruments TMS 320C30.

As illustrated in FIG. 1, where computer terminal data equipment is provided no digital signal processor is necessary, and the respective line interface unit may be connected directly to a input/output port of the frame relay processor 11.

Figure 2:
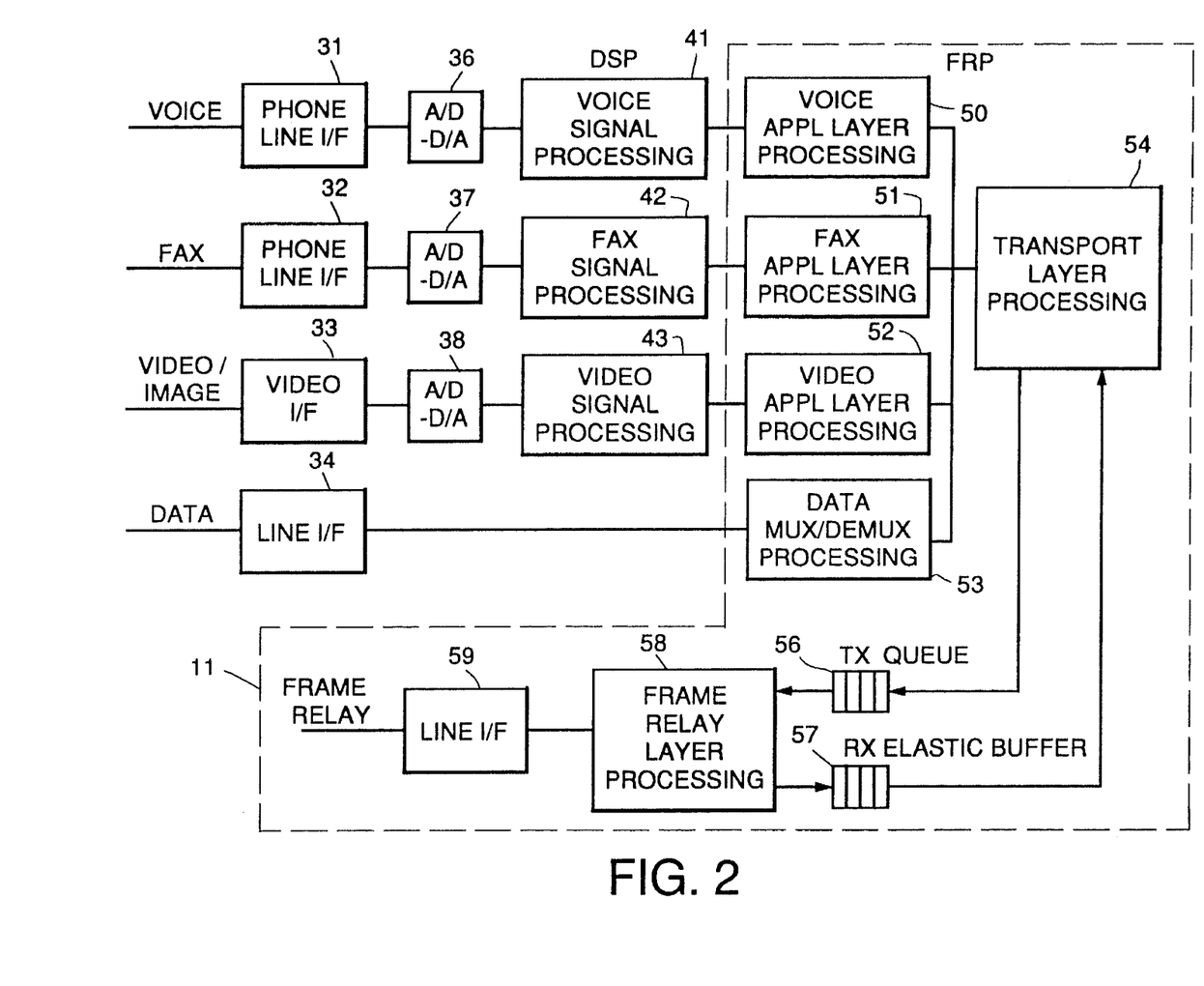
FIG. 2 is a functional block diagram of the multimedia frame relay codec of FIG. 1.

The operation of the codec of FIG. 1 is functionally illustrated in the block diagram of FIG. 2. Turning now to FIG. 2, each of the media terminal input lines is shown connected to respective line interface functions 31 through 34. The line interfaces provide for impedance matching between the respective terminals and the following digital processing equipment.

The DSP functions 41 through 43 are unique to the specific media which they process. The DSP function 41 for voice signal processing provides for the speech compression/decompression using standard compression algorithms. The communication path between the terminal equipment and the digital signal processing is full duplex, permitting the transmission and reception of data to the respective terminals.

The voice signal processing function 41 provides for speech frame buffering and packetization of incoming data packets. Further, when a voice terminal goes off hook, the signalling packets are generated for initiating a call set up over the frame relay network. The usual protocol functions in a voice communication path, i.e., detection of on/off hook, the detection of dial digits or tones, is implemented in the voice signalling processing function 41. Further, the aforesaid digital signal processor may implement error correction.

Signal processing function 42 provides for a fax interface to the frame relay processor. The fax signal processing function 42 receives data from a respectively connected fax terminal as a two-way communication path through the A-D/D-A converter function 37. Fax signal processing is not full duplex, as the transmit receive functions do not occur simultaneously.

The fax demodulation using standard modem signalling is provided by the fax signal processing function 42. The signal processing function may implement the CCITT V29, V27 protocol for creating packets of digital data representing the fax transmission. Further, received fax transmission packets over the frame relay network are decoded and applied to the digital to analog function 37.

The signal processing function 42 will provide the data/message frame buffering/packetization, as well as synchronization between the frame relay processor and the connected fax terminal equipment. As in voice signal processing, phone line handling, i.e., on/off hook status, dial digits, etc., are decoded in the signal processing function 42, and forwarded to the frame relay processor for setting up the connection to the dial destination.

As a further example of the multimedia aspect of the present invention, video image information may also be transferred via the frame relay network. The line interface unit 33 provides for the required interface/impedance matching to the analog/digital and digital/analog circuits presented by function 38. A video signal processing function 43 is implemented by the respective digital signal processor for providing video compression/decompression through standard compression algorithms. The data is packetized and synchronized to the incoming scan rate.

All the signal processing functions 41 through 43 provide a frame relay processor interface function. The input/output ports connecting the digital signal processors to the frame relay processors receive and transfer data under control of the frame relay processor. The frame relay processor functions are illustrated as Items 50 through 59. Each of the media acquire an application for processing received and transmitted media data. The voice application layer 50, fax application processing 51, video application layer processing 52 and data MUX/DEMUX processing 53 format the packets of media data for transmission in the frame of a frame relay network. There is a transport layer processing 54 which provides for the common end-to-end delivery and session control functions for frames on a frame relay network.

Frames of multimedia data created by the application layer processing 50–53 are stored in a transmit queue 56, along with the transport layer information. Incoming data received over the frame relay network is processed in a frame relay layer processing step 58 to remove the various headers associated with the frame relay and to store recovered media data in an elastic buffer 57.

The application layer processing 50–53 and transport layer processing 54 operate in the background of the frame relay processor. The foreground processing is devoted to processing incoming frames of multimedia data.

The multimedia frame relay codec employs protocol layer processing to create frames of multimedia data as well as to process incoming frames of multimedia data.

Figure 3:
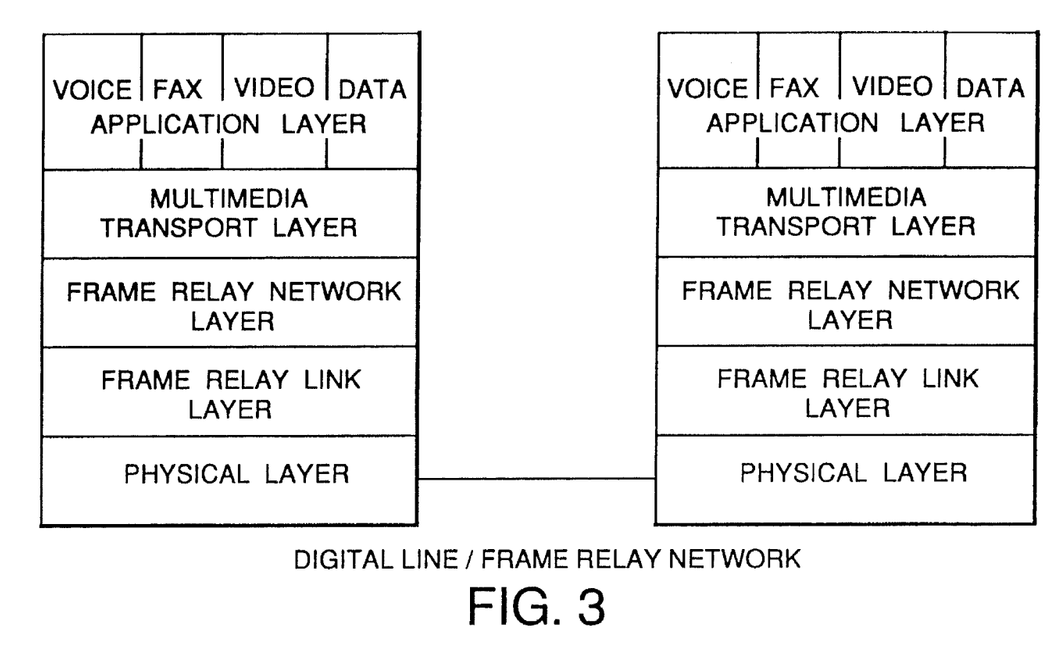
FIG. 3 illustrates the protocol layers used for communicating between multimedia frame relay codecs.

Turning now to FIG. 3, the process of protocol layering carried out by the frame relay processor is shown. The topmost layer is the application layer provides specific signal processing of the multimedia traffic. This would include the call processing initiated by users, the processing afforded by the digital signal processor of each media type. Creation of the various packets for transmission over the frame relay network occurs within the application layer operating in the background of the frame relay processor.

The multimedia transport layer provides for common end-to-end data delivery and session control functions. This would include sequencing, delay compensation and network error handling for the frames transmitted and received over the frame relay network.

The standard frame relay network signalling functions are carried in the frame relay network layer. The frame relay network layer provides for network management of each of the transmitted frames.

A frame relay link layer provides the standard relay network core link layer functions. These would include the framing of the headers, media data packets and synchronization functions which are common to the frames sent over a frame relay network.

The bottom protocol layer is the physical layer. This is the physical connection to the frame relay network node. The requirements for this layer are set forth in the standards, such as CCITT V35/EIA 530.

The physical layer frame relay link layer and frame relay network layer are all standard frame relay protocols and are described in the ANSI T-617 document.

Figure 4A:
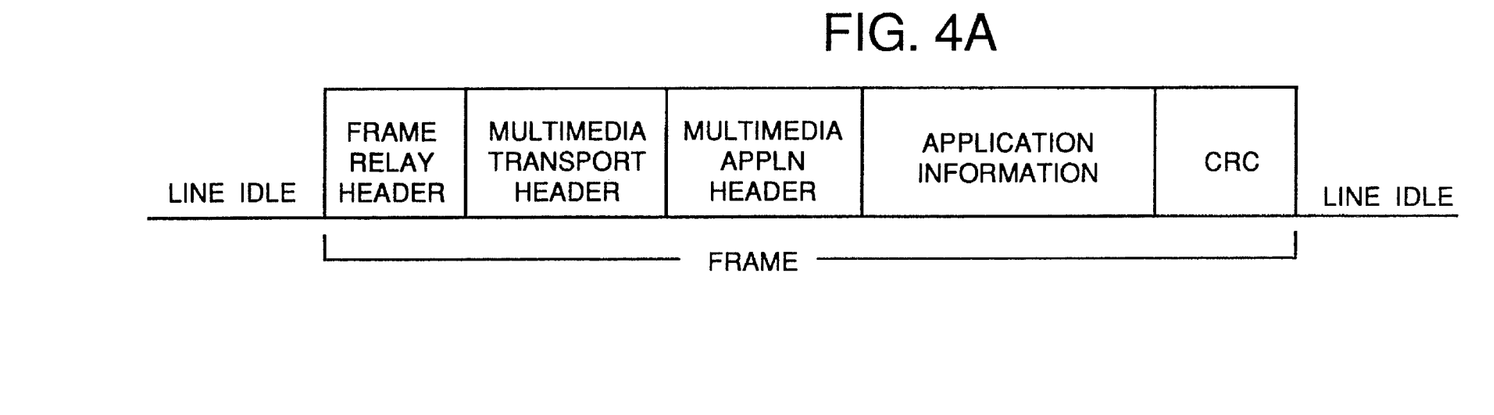
FIG. 4A illustrates the format of a frame used on a frame relay transmission line carrying multimedia data.

The foregoing protocol processing produces a frame of data bits in accordance with FIG. 4A. FIG. 4A shows the distinct fields of the frame. The line idle portion contains the standard frame relay idle pattern of 01111111. The frame relay header also contains standard frame relay header information such as the network connection identifier which is addressing information for the network (DLCI) and other network control information. This would include the congestion and priority information contained in a standard frame relay header.

Adapting the frame relay network for use in the multimedia environment requires a multimedia transport header. This header contains information which is sent transparently across the frame relay network to provide common multimedia transport functions for the receiving codecs. The fields constituting the multimedia transport header include the following options:

1) Protocol Identifier (for example, a multimedia or other standard frame relay protocol 2) Message Type (i.e., the transport setup information acknowledgement and connection status)

3) Error Recovery Option

4) Multi-Cast Connection Option

5) Message Transmit Sequence Number

6) Message Receive Sequence Number Option and a Delay Measurement Variable.

A multimedia application header is also contained within the flamework. The multimedia application header contains more information, sent transparently across the frame relay network, which is needed by the voice/fax/video data applications running in the frame relay processor of the codec. This includes fields which have an application identifier to identify voice, fax, video data or other media formats, as well as a message type to identify information packets from control packets to each of the receiving codecs.

The field identified as application information contains the media packets which were generated by the digital signal processing devices of each transmitting codec. These packets can be voice, fax, video or data bits, or alternatively, user call control messages. The application header will define to which media type the particular data packet belongs.

Finally, the frame concludes with an error detection code to permit each of the nodes to do error checking.

As illustrated in the foregoing frame, the application running in the frame relay processor creates a single frame containing data bits belonging to one or more multimedia signals. For example, video and audio information may be sent in the same frame during a common audio/video session application. Speech and/or graphics information may be sent in the same frame for a common audio graphics application. The sharing of data is utilized when needed for synchronization and bandwidth saving purposes.

No matter what the media being sent over the frame relay network, the end-to-end transport protocol is common to all media and the protocol elements such as sequencing, activity detection, network delay compensation, synchronization, error handling and point-to-point/multicast connectivity are the same. The transport and application layer protocols are specifically designed for the multimedia applications over frame relay networks.

The digital signal processors convert all the different media information signals into a common packet size so that they can be handled interchangeably. The digital signal processors may be configurable by software, downloaded from a particular frame relay processor selected by the codec operator. Thus, a single digital signal processor element might be used for processing voice or some other media at the selection of the operator.

Figure 4B:
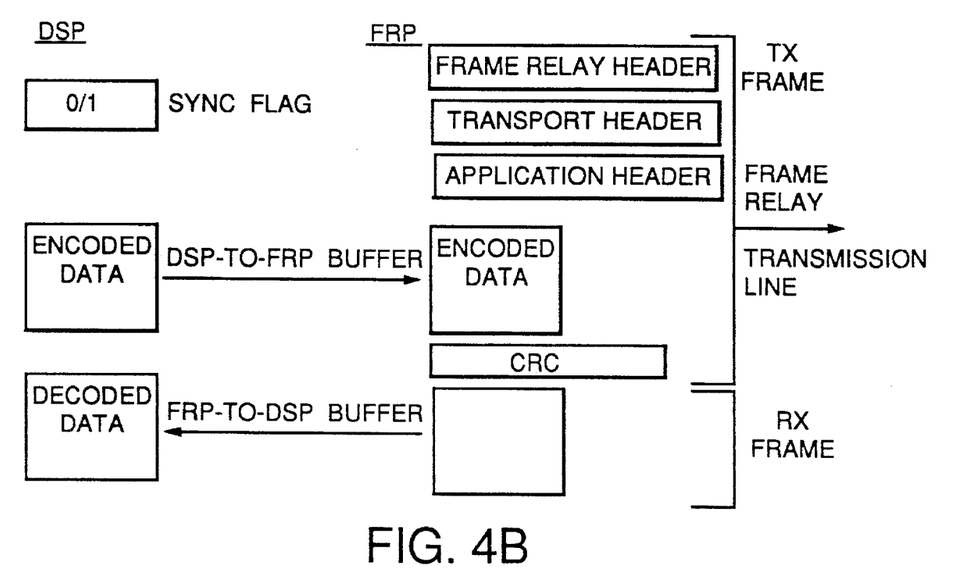
FIG. 4B illustrates the frame transfer between the DSP and frame relay processor of the codec.

FIG. 4B illustrates the time sequence in which data is exchanged between the digital signal processor and frame relay processor buffer.

The digital signal processor receives the multi-media data as a continuous bitstream from the line interface unit 21 through 25 of FIG. 1. The digital signal processor stores the received data in a memory buffer for a sample time which, in the case of voice media, is 20 milliseconds. The digital signal processor then encodes the data, through standard compression algorithms, and writes the compressed output in a memory area which is accessible by the frame relay processor. The digital signal processor sets a SYNC flag in this memory area, indicating that the compressed data is ready for transfer over the frame relay.

The frame relay processor reads the compressed data and creates the frame, including the compressed audio and any other media data received from other line interface units of other digital signal processors. The frame relay processor completes processing of the outgoing frame, and then resets the SYNC flag on the digital signal processor. This time, the application running in the digital signal processor, be it voice data, fax, etc., checks the elastic buffer for any frame received from the frame relay line. The frame relay processor builds the received frames in its memory, and then writes the frame to the digital signal processor memory area reserved for receiving frames from the frame relay processor. At this time, the frame relay processor resets the SYNC flag to zero on the initial signal processor.

Figure 5:
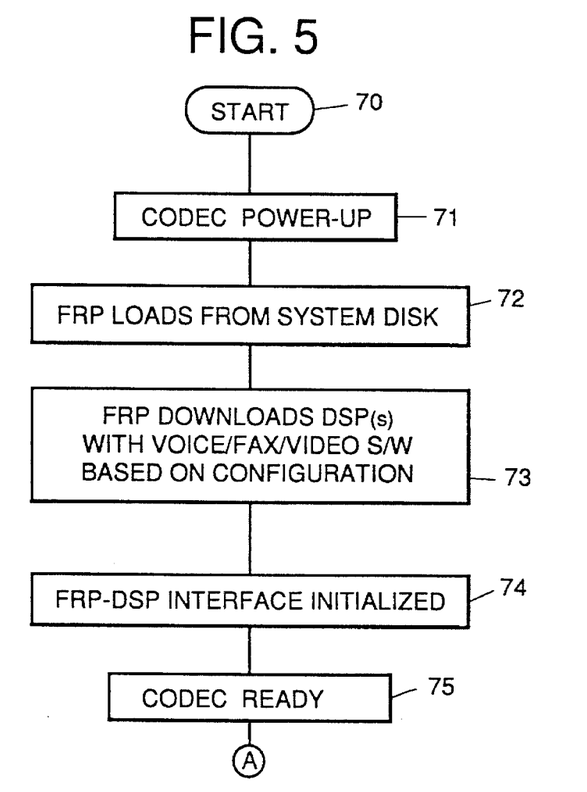
FIG. 5 shows the power-up sequence for the frame relay codec.

The sequence of codec processing is illustrated in FIGS. 5–10. Referring to FIG. 5, the power-up process begins with the start block 70. The frame relay processor, as well as the digital signal processors are powered-up in a normal computer processor power-up condition.

Based on the operator selections entered through the frame relay processor, the frame relay processor loads the operating program from the system disk. During a download routine, each of the digital signal processors are configured in step 73 to match the connected terminal equipment. The various protocols relating to voice/fax/video are configured as needed in each of the digital signal processors.

Once the digital signal processors are configured for their respective connected terminal equipment, the interface between the frame relay processor and digital signal processors are initialized. This interface may be a plurality of serial ports, each of which under control of the frame relay processor receives and/or delivers data to a respective connected digital signal processor.

Figure 6A:
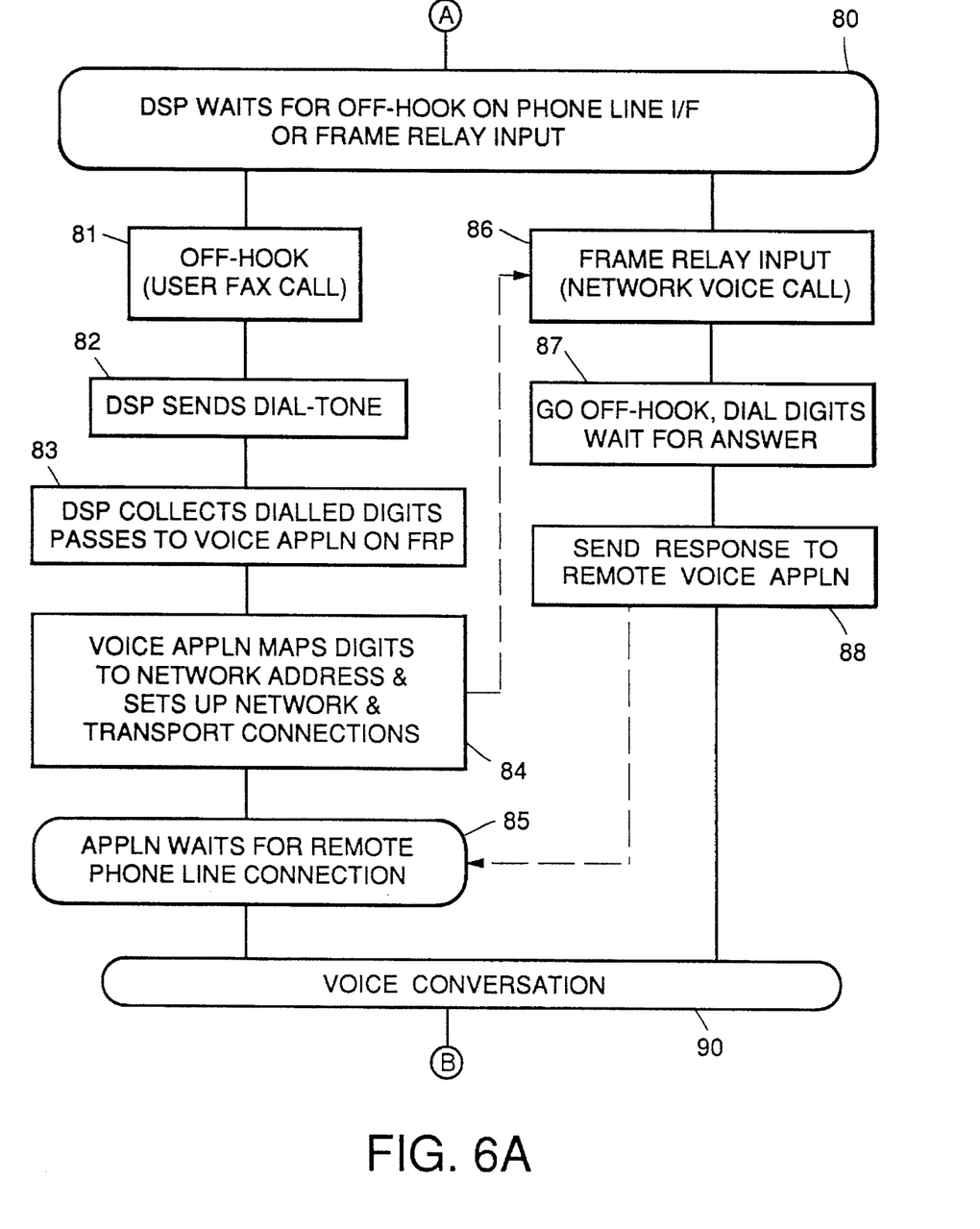
FIG. 6A shows a voice call set up for initiating voice traffic over the frame relay.

When the initialization routine is completed in step 75, the codec is ready to set up a call for any one of the connected terminal equipment. FIG. 6 in particular illustrates a voice call set up when the voice terminal equipment goes off-hook.

As step 80 illustrates, the off-hook is detected at the digital signal processor connected to the telephone line interface unit. Additionally, a signal from the frame relay processor will indicate incoming traffic for a connected telephone terminal. The command to the digital signal processor generates a ringing current out to the connected telephone terminal.

The off-hook condition 81 results in the digital signal processor sending dial tones back to the connected telephone terminal. The digital signal processor collects dial digits from the connected telephone terminal in step 83, and passes the collected digits to the voice application on the frame relay processor.

The frame relay processor in step 84 executes the voice application program in the background and maps the collected digits to a network address. The frame relay processor will begin to create the frame for transmission over the frame relay network, which includes the network and transport connections.

The frame relay processor, having initiated a frame containing the network transport connections, waits for the frame relay network to return a remote phone line connection, indicating that the destination party has been reached and has gone off-hook.

Steps 86, 87 and 88 demonstrate the activity at the remote destination codec. The frame relay input, in step 86, carries the dialed connection request to the destination codec. When the destination codec goes off-hook in 87, a remote response is sent through a second frame originated in step 88 at the remote destination codec over the frame relay network.

The call setup protocol, standard in most telephony applications, results in a voice connection being made in step 90.

Figure 6B:
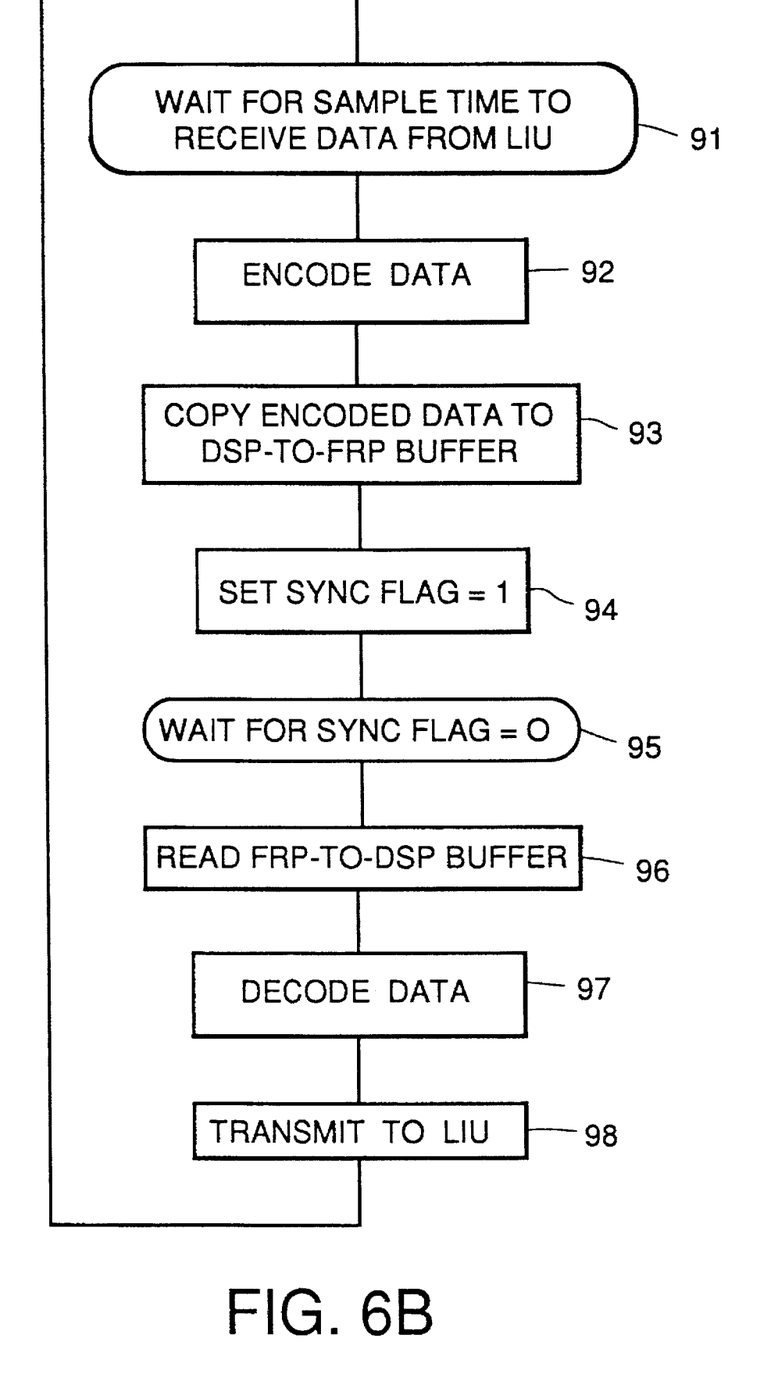
FIG. 6B is a flow chart illustrating how the digital signal processor processes audio samples received from the line interface unit and frame relay processor.

The process for transferring the voice data between a digital signal processor and the frame relay processor is shown in a flow chart diagram in FIG. 6B.

The digital signal processor waits for each sample time to receive the voice data from the line interface unit in step 91. The receive data is encoded in step 92, using the conventional data compression algorithms. The encoded data is written to the digital signal processor memory, and then to the frame relay buffer in step 93. The SYNC flag at the digital signal processsor is set to 1 in step 94.

Once the SYNC flag has been set to zero, indicating that the frame relay processor has voice data to transfer to the digital signal processor in step 95, the digital signal processor will read the frame relay buffer data in step 96. The data is decoded in step 97 by removing the various headers associated with the data and the data is subject to decompression. The recovered data from step 97 is transmitted to the line interface unit in step 98.

Figure 6C:
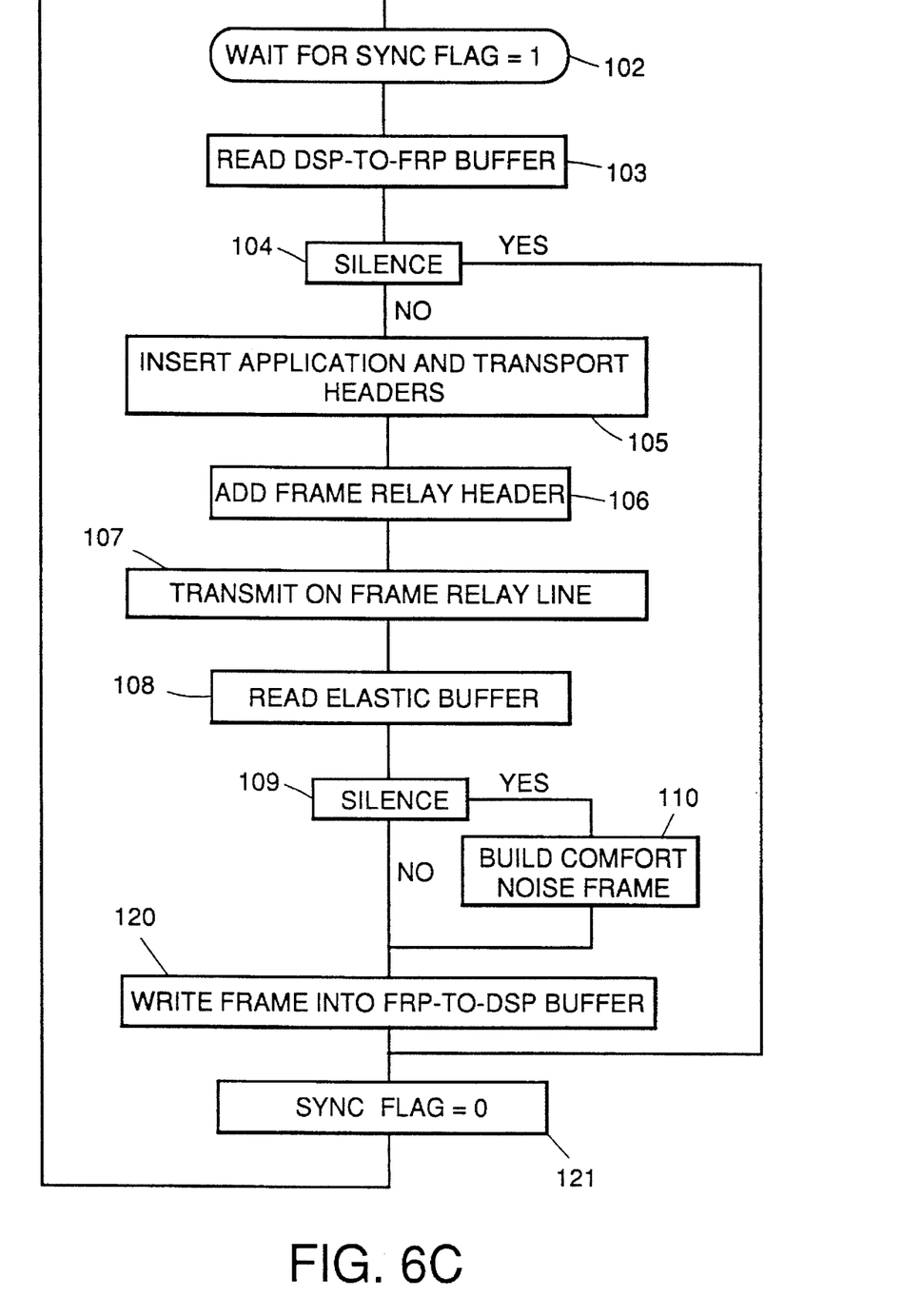
FIG. 6C shows the data transfer between the digital signal processor and frame relay processor for other media applications.

In the frame relay processor, various steps are executed as shown in FIG. 6C. When the SYNC flag has been set to 1 in step 102, the digital signal processor data is read from its respective memory to the frame relay processor buffer in step 103. In the case of a voice application running in the digital signal processor, the application checks whether the data is speech or silence, based on the signal energy level. No further processing is done for silent data. For speech data, the frame relay processor readies the frame for transmission by inserting the application in transport layer header information, including application identifier and sequence number in the proper memory locations in step 105. The frame relay buffer is then handed over to the frame relay layer which builds the remainder of the frame, including the frame relay header and CRC code. The completed frame is transmitted on the frame relay line in step 107.

Once the frame is transmitted, the voice application in the frame relay processor checks the elastic buffer in step 108 for any frame data received from the frame relay. The processing of the frame contained in the elastic buffer occurs by reading the list of pointers created by the frame relay processor. When the pointer indicates there is a new frame in the frame relay buffer, the sequence number contained in the header information is consulted to determine whether the frame is to be handed to the digital signal processor immediately or delayed for some time, as would occur when silence periods occur in voice data. For the case where silence is indicated by the frame relay header information in step 109, the frame relay processor in step 110 will build a frame in its memory which contains the appropriate comfort noise for this conversation. The frame relay processor in step 120 then writes the frame into the digital signal processor memory area reserved for receiving frames from the frame relay processor buffer memory. At this time, in step 121, the SYNC flag is set to zero.

Figure 7:
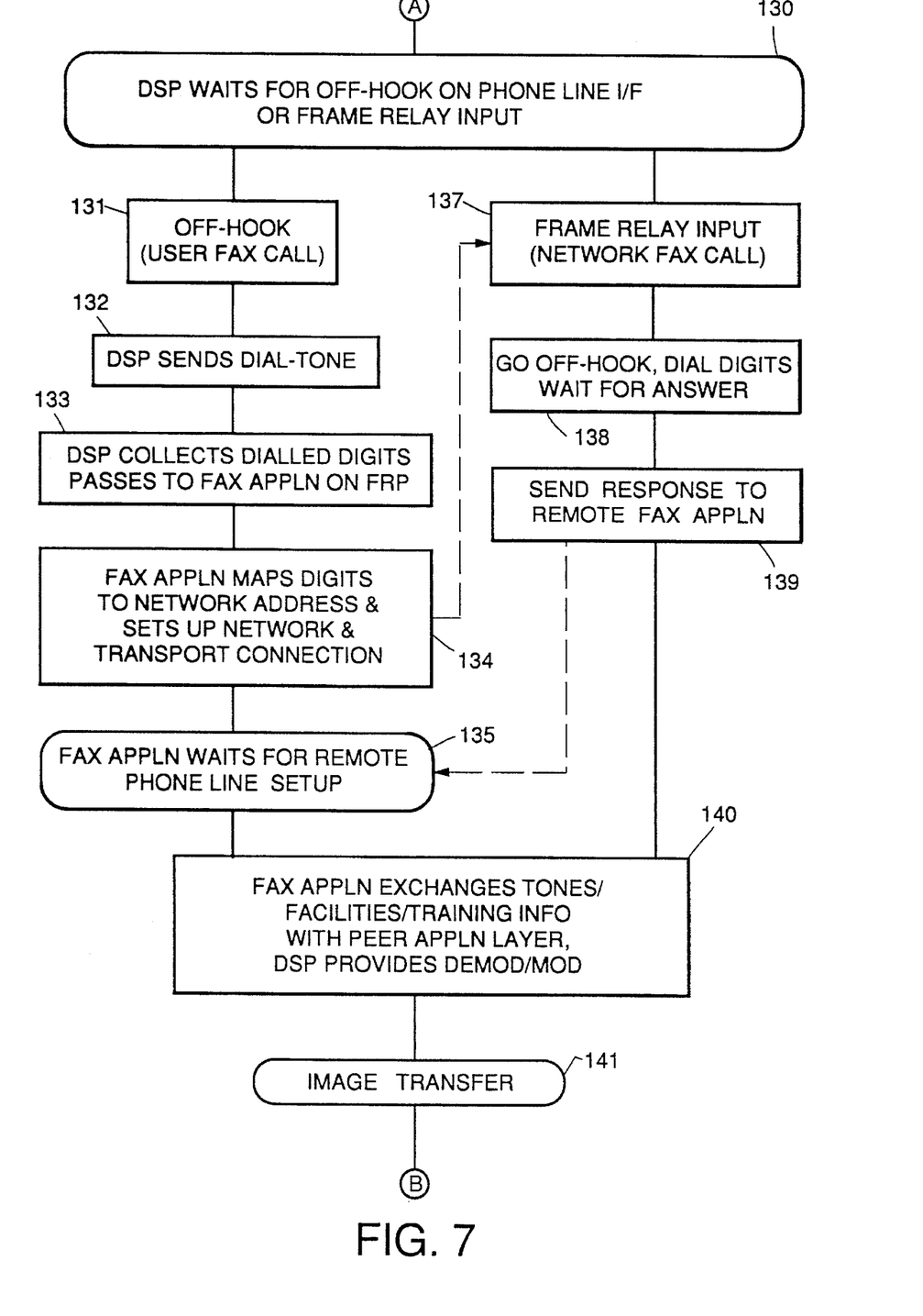
FIG. 7 illustrates the frame relay codec setup of a fax call between codecs.

Fax calls are similarly set up and the process for setting up such a fax call is shown in FIG. 7. Referring now to FIG. 7, block 130 indicates that the digital signal processor which has been initialized for the fax terminal equipment operation, waits for an off-hook condition or a frame relay input signal indicating fax traffic has been received. The off-hook initiated by a connected terminal fax facility in step 131 results in a dial tone being sent from the digital signal processor in step 132 back to the fax terminal. Dial digits are initiated at the fax terminal and are collected at the digital signal processor. The digital signal processor will pass the collected digits onto the frame relay processor for setting up the connection between the originating codec and the destination codec.

The frame relay processor initiates the frame for setting up the connection in step 37. The destination codec goes off-hook in step 138 when it receives the request from its node connected to the frame relay network. The off-hook condition is reported via a frame from the destination node to the originating node, indicating a connection has been set up.

Step 140 illustrates the normal fax application tone exchange which occurs between the connected codecs. Each of the digital signal processors will initiate an exchange of the required fax tones per the CCITI standard and provide for modulation and demodulation of the fax signal on the required carriers and from the carriers.

A transfer of the image following the appropriate tone exchange between connected fax facilities occurs in step 141.

Figure 8:
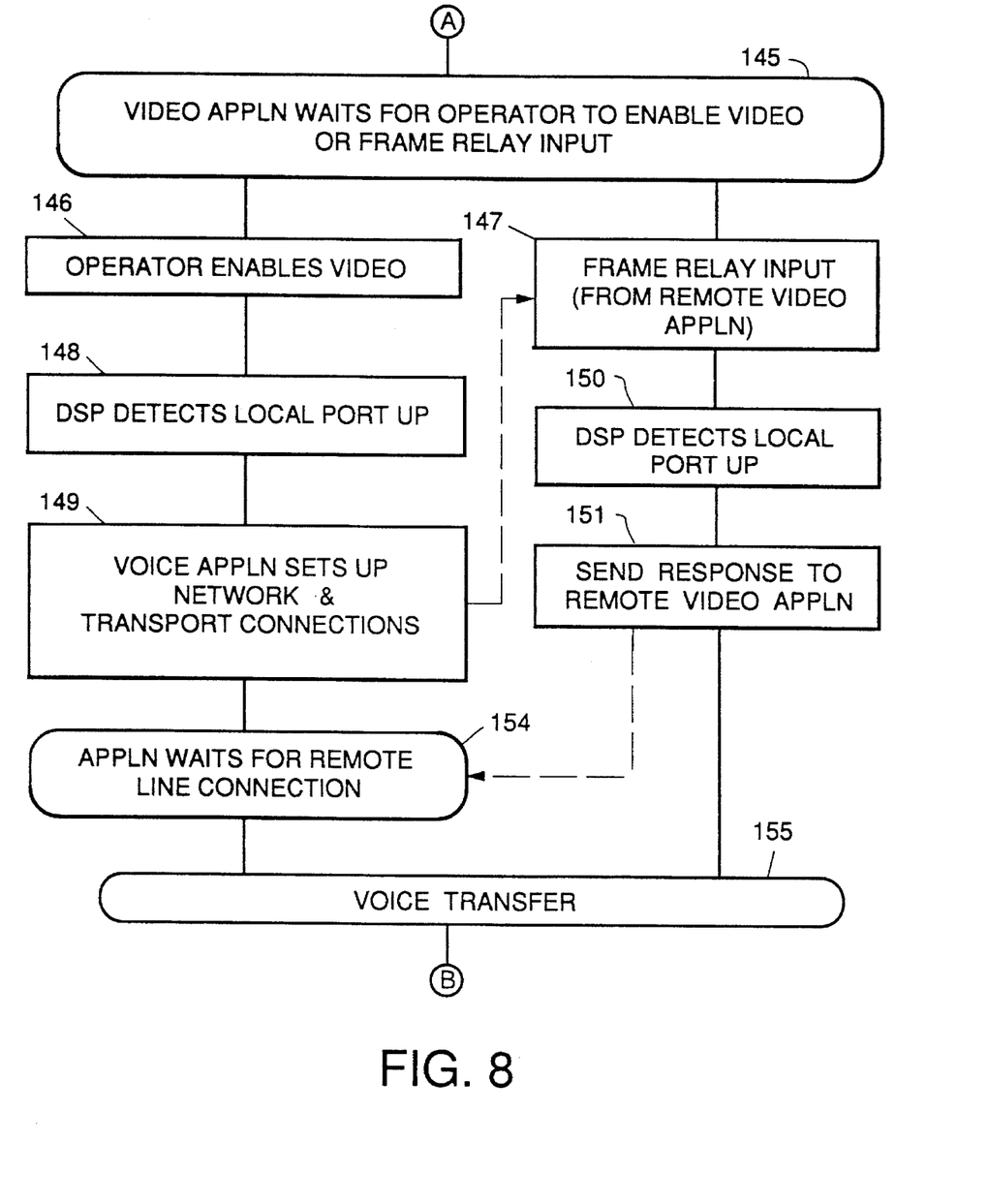
FIG. 8 illustrates a video connection setup between frame relay codecs.

The multimedia codec handles a video connection in a similar manner. Referring to FIG. 8, the video application running in the background of the frame relay processor waits for a video signal to be applied from a connected digital signal processor 4 from a frame received on the frame relay network in step 145.

To initiate a video transmission from the codec, the operator initiates video transmission in step 146. The connected digital signal processor will detect activity on its connected port, and signal the frame relay processor to set up network and transport functions for a video data transfer.

The frame relay processor will create the requisite frame having the destination digits and transport information and apply the same to the frame relay network in step 147. An addressed network port on the frame relay network will receive and decode the received frame. Recognizing the destination address, the connected frame relay processor will initiate activation of its digital signal processor in step 150, which is connected to its respective video terminal. A response is sent in step 151 over the frame relay network, via the respective remote frame relay processor completing the connection to the originating codec.

At this point, a video transfer will occur in step 155 such that video is transmitted via the first codec as packetized video data over the frame relay network to the destination codec and its connected video terminal.

Figure 9:
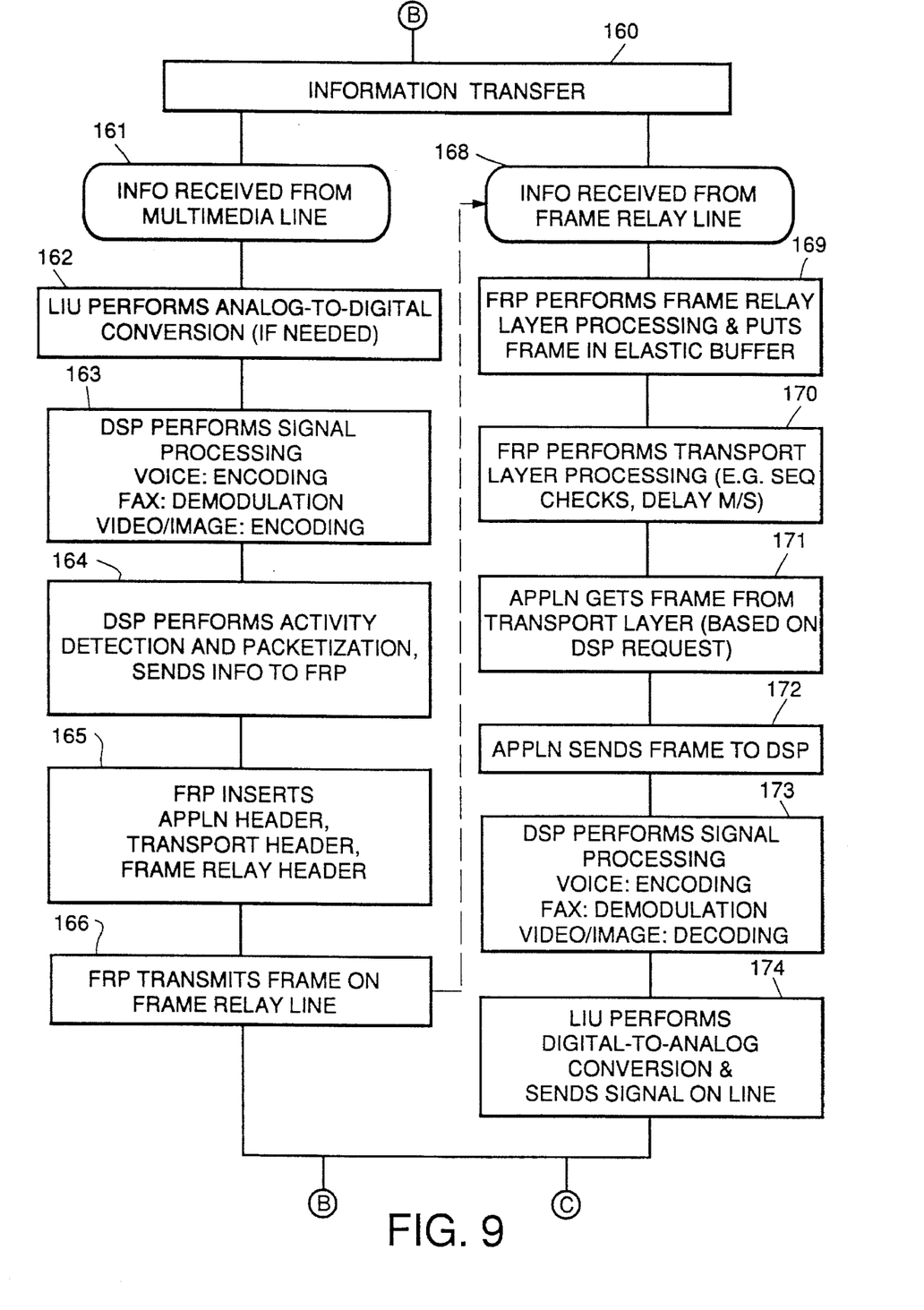
FIG. 9 is a flow chart illustrating the transfer of multimedia information over the frame relay.

The information transfer phase which accompanies any one of the frame relay multimedia signal transfers is illustrated in FIG. 9. The information transfer step 160 begins with information received from the connected multimedia line in step 161. This can be any of the multimedia lines which may be receiving traffic once a connection has been set up.

The respective line interface unit performs analog digital conversion in step 162, where such media is in the analog format. The digital signal processor will perform the signal processing which may include, in the case of a voice transmission encoding the voice with a compression algorithm, as well as packetizing the voice. Further, in the fax situation, a demodulation may occur of the received fax carriers to obtain a signal which can be converted to digital packets. In the case of a video transmission, the video is compressed and converted to digitized packets.

In step 164, the digital signal processor performs activity detection, detecting the presence of such information and the respective packetization for sending to the frame relay processor. The frame relay processor builds the frame of FIG. 4 by creating the application header, transport header and frame relay header. The created frame is transmitted along with the packets of digital information on the frame relay network, in step 126.

A receiving codec operates in step 168 to remove the frame destined to the connected codec from the network node. The frame relay processor, in step 169, does the protocol layer processing, and removes the information packets for storage in an elastic buffer. The frame relay processor will perform the transport layer processing, i.e., sequential checks, delay measurements. etc., in step 170, as is common in frame relay protocol.

Each of the voice, fax video applications running in the background of the frame relay processor, obtains the frame from the transport layer, based on a digital signal processor request in step 171. The removed frame is sent to the digital signal processor in step 172. This requires that the frame be retrieved from the elastic buffer and it be identified as containing the appropriate media information for the requesting digital signal processor.

The connected digital signal processor performs signal processing including voice decoding, fax modulation or video/image decoding, depending on the information transfer in step 173. The line interface unit on the outgoing side of the digital signal processor will, for appropriate media, make the digital-to-analog conversion for transmission to the connected terminal equipment.

Thus, it can be seen that virtually all communication media can be reduced to digital packets which can be transported via frame relay network to a connected codec.

Figure 10:
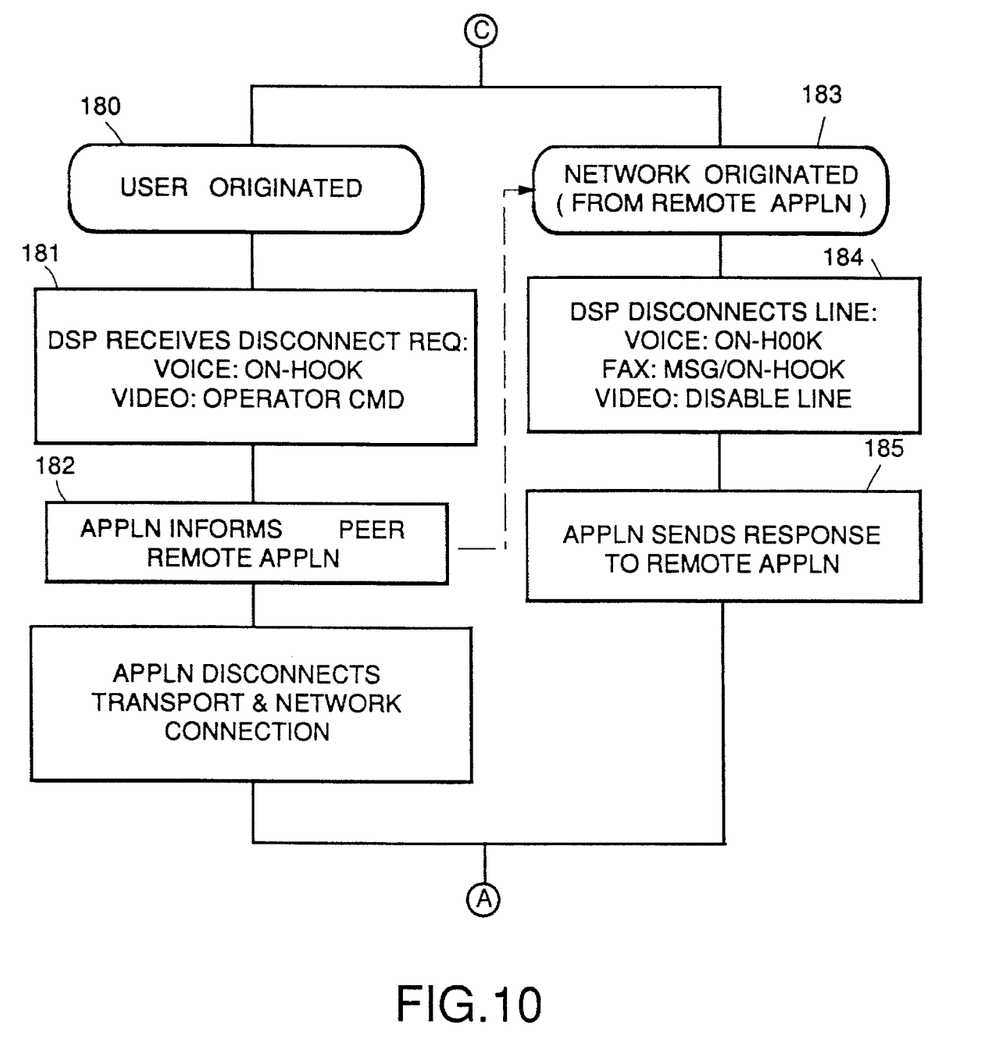
FIG. 10 illustrates the call disconnect process for disconnecting from the network node of a frame relay network.

Following any one of these information transfers, a call disconnect is originated in which a user having completed the information transfer, will initiate the disconnect in step 180. The receiving digital signal processor recognizes the disconnect request and, in the case of voice, goes on-hook, in the case of fax on-hook, or identifies to a video operator the end of transmission period.

The application, running in the frame relay processor, will inform the sending codec of the disconnection, via a subsequent issued frame over the frame relay network. The receiving digital signal processor will disconnect its line, going on-hook in the case of a voice or fax transmission, and in the case of video, a disable mode in step 184. The application sends a response to the remote application in step 185, indicating it has completed its disconnect.

Figure 11:
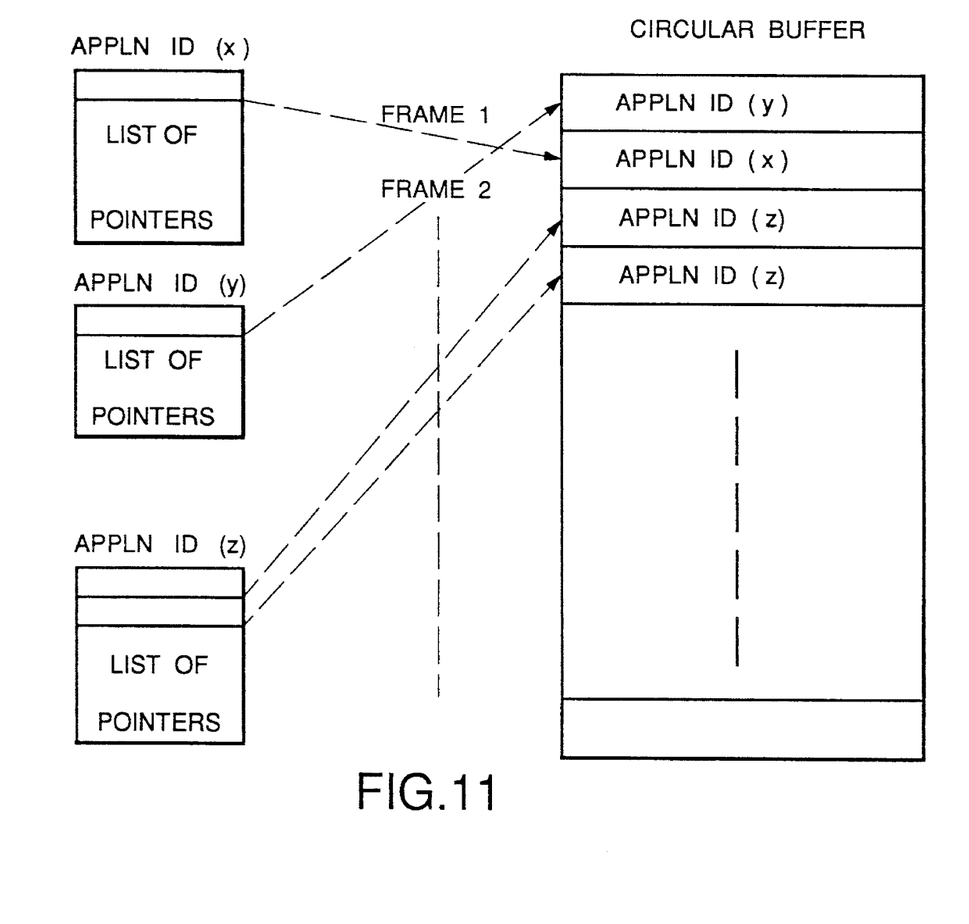
FIG. 11 illustrates the processing of multimedia data received over a frame relay.

The multimedia codec will receive frames over the network pursuant to an information transfer which may be of any one of the media types. As the receipt of such frames must be handled on a priority basis, the frame relay processor operates in the foreground on received frames which are destined for a connected codec. Foreground execution begins from an interrupt issued to the frame relay processor from the network and stores each of the information fields received in a circular buffer, permitting applications running in the background of the frame relay processor to access this data and forward it out to an appropriate digital signal processor.

FIG. 11 illustrates the elastic buffer and its list of pointers which permit the background applications access to received frame data. FIG. 11 illustrates a circular buffer wherein data is stored for applications X, Y and Z. These applications may be distinctly different media type such as telephone, fax and/or video.

The frame relay layer receives frames from the frame relay network in the foreground, wherein an interrupt switches the frame relay processor from background to foreground operation. The received frames are written in the circular buffer. At this time, the delay measurement variable in the transport header of the frame is read, and the measured delay value for the transport connection is updated. Each of the stored frames is identified in a list of pointers, dedicated to each of the different application types serviced by the frame relay processor. Thus, voice frames are identified in one list of pointers, fax frames in another list of pointers, and video frames in another list of pointers, etc. The size of the elastic buffer is preallocated, based on the frame relay line rate and the application bit rates.

The frame relay processor reverts to the background mode, once the incoming frame has been stored. The transport and application layers process the frame in the background. It the transport header indicates a transport layer control message, the message is processed by the transport layer. If the transport header indicates information is present in the frame, then the transport layer checks with the transmit/receive sequence numbers for error, assuming error recovery is required by the application. The pointer to the valid frame is written in the corresponding applications' list of pointers.

The application layer reads and processes its receive frames, identified from the list of pointers. Frames are processed differently by the application layer, depending on the application. In the case of voice, the voice application reads the application message type to determine whether this frame is a control message or voice information.

If it is voice information, the transmit sequence number is compared with the next expected transmit sequence number to determine whether the voice frame is to be given to the respective digital signal processor, or deferred and instead silent frames are given to accommodate gaps in speech spurts.

The application for processing fax frames reads the application message types and processes fax protocol messages. The image information contained in a frame is given to the digital signal processor for decoding modulation and transmitting out over the corresponding line interface unit to the connected fax equipment.

The video application reads the application message type and processes any control message contained therein. Video data contained in the frame is given to its respective digital signal processor for decompression and transmission to the connected video terminal equipment.

In the case of computer data received from the frame, a data application running in the background of the frame relay processor reads the received frames and outputs them transparently to a data port connected to computer terminal equipment.

Each of the applications have a delay parameter to determine when to start reading the elastic buffer. This will allow the application to accumulate a certain number of frames in the elastic buffer to provide for any cushion against the changes in network delay. The delay parameter is controlled dynamically based on the network delay measurements done by the transport layer processing.

Applications that send mixed media data, such as audio, fax and video in the same frame, for synchronization or bandwidth saving purposes, are handled the same. The transport layer for such frames determines that more than one application data is contained in the frame by checking the ID field, which will identify a group of applications being serviced by the frame. The transport layer writes the frame pointer in multiple lists of pointers for these applications. Each application then processes the frame independently, using only its portion of the information from the application information field of the frame.

Thus, there has been described with respect to one embodiment a multimedia codec which may be implemented on frame relay network architecture. Those skilled in the art will recognize yet other embodiments described more particularly by the claims which follow.

What is claimed is:

1. A multimedia frame relay codec comprising:
   a voice line interface unit for providing digitized voice data packets;
   a video line interface for providing digitized video signal packets;
   a data line interface for providing data packets generated from a computer terminal;
   a plurality of digital signal processors, each of said digital signal processors connected to one of said line interface units, for encoding signals received from a respective line unit, and decoding signals received from a frame relay network;
   a frame relay processor connected to each digital signal processor, said frame processor being programmed to operate in a foreground mode in response to receipt of an interrupt generated in response to receipt of a data frame from said frame relay network said processor during said foreground mode storing; data fields comprising voice data, video data and computer terminal data in an elastic buffer, and generating lists of pointers for identifying where said voice, video and computer terminal data packets are stored; and,
   a background mode executing first, second and third applications which retrieve said stored voice data, video data and computer terminal data packets, and providing said data to a respective digital signal processor.

2. A multimedia frame relay codec of claim 1 further comprising a fourth application running in said frame processor background mode, which forms a data frame from data received from said first, second and third digital signal processors, said data frame including a multimedia transport header for identifying to a receiving codec connected to said frame relay common multimedia transport functions.

3. The multimedia frame relay codec of claim 2 wherein said data frame includes a multimedia application header which identifies whether said frame includes voice data, video data or computer terminal data.

4. The frame relay codec of claim 1 wherein said frame relay processor creates lists of pointers, each list identifying the buffer locations having respectively voice data, video data and computer data.

5. The frame relay codec of claim 4, wherein said background mode executes first, second and third applications which read said voice data, video data and computer data, an route said voice data, video data and computer data to a respective digital signal processor.

6. A multimedia frame relay codec comprising:
   first, second and third line interfaces connected to first, second and third different sources of media;
   first, second and third digital signal processors connected to said first, second and third line interfaces;
   a frame relay processor connected to each of said digital signal processors and to a frame relay network, said frame relay processor having an elastic buffer for storing incoming media data packets, said frame relay processor programmed to operate in a foreground mode to store received data packets in said elastic buffer, and create pointer lists identifying packets by media type, and said frame relay processor executing in the background applications for transferring said media data packets to respective digital signal processors.

7. The multimedia frame relay codec of claim 6, wherein said frame relay processor is programmed to execute an application to create a frame of data for transmission over said frame relay to a receiving codec connected to said frame relay network.

8. The multimedia codec of claim 7 wherein said frame of data includes an application field for identifying information packets contained in said frame as originating from said first, second and third sources of media.

9. The multimedia frame relay codec of claim 6, wherein said digital signal processor is programmed to generate compressed digital voice data from a voice signal produced from one of said line interfaces, and store said compressed voice data in a memory of said digital signal processor, and sets a flag for indicating to said frame relay processor that said compressed data is available for transmission over said frame relay network.

10. The multimedia frame relay codec of claim 9, wherein said frame relay processor retrieves said compressed data and stores it in a buffer memory when said flag is set.

11. The multimedia frame relay codec of claim 10, wherein said frame relay processor is programmed to create during said background a frame for transmission which includes said compressed voice data, a frame header, application header and a transport header.

12. A method for transferring multimedia signals between stations connected to a frame relay network comprising:

receiving a plurality of multimedia information signals at one of said stations;

digitizing and storing each of said multimedia signals as a plurality of packets;

creating a frame of data from said plurality of data packets which includes a frame relay header, transport header and multimedia application header;

transferring said frame of data over said frame relay network to a second station, and at said second station, storing said frame of data in an elastic buffer at said second station;

creating a pointer list for each media type contained in said frame of data, each pointer list containing data which identifies the location of said frame data by media type; and, retrieving said stored frame data and routing, said stored media data to one of a plurality of digital signal processors which delivers a signal derived from said media data to a line interface unit.

13. The method according to claim 12, further comprising determining from said multimedia application header whether said frame data is voice data, facsimile data or video data.

14. The method of claim 13 wherein said retrieving of said stored media includes the step of determining from said header whether said media data is voice data which includes silence periods, and further comprises the steps of adding comfort noise to said voice data.

15. The method of claim 14, wherein said retrieving step further comprises building a second frame of data which includes said comfort noise data.

* * * * *